US 10,947,934 B2

United States Patent
Asai

(10) Patent No.: US 10,947,934 B2
(45) Date of Patent: Mar. 16, 2021

(54) CONTROL DEVICE FOR INTERNAL COMBUSTION ENGINE AND CONTROL METHOD FOR INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 51 days.

(21) Appl. No.: 16/316,840

(22) PCT Filed: Jun. 29, 2017

(86) PCT No.: PCT/JP2017/024045
§ 371 (c)(1),
(2) Date: Jan. 10, 2019

(87) PCT Pub. No.: WO2018/012305
PCT Pub. Date: Jan. 18, 2018

(65) Prior Publication Data
US 2019/0234354 A1    Aug. 1, 2019

(30) Foreign Application Priority Data

Jul. 14, 2016 (JP) .............................. JP2016-139571

(51) Int. Cl.
*F02M 31/083* (2006.01)
*F02M 26/36* (2016.01)
(Continued)

(52) U.S. Cl.
CPC ............. *F02M 31/083* (2013.01); *F01N 3/20* (2013.01); *F02B 15/00* (2013.01); *F02B 51/00* (2013.01);
(Continued)

(58) Field of Classification Search
CPC ............... F02D 41/0047; F02D 41/005; F02D 41/0052; F02D 41/0055; F02D 41/0057;
(Continued)

(56) References Cited

U.S. PATENT DOCUMENTS

2004/0144337 A1    7/2004 Wakao et al.
2006/0169246 A1*   8/2006 Asai .................. F02D 35/025
                                                     123/305
(Continued)

FOREIGN PATENT DOCUMENTS

JP        52-009712 A      1/1977
JP        2006-022724 A    1/2006
(Continued)

OTHER PUBLICATIONS

Machine Translation Provided by IP.com of JP-2016166611-A (Year: 2020).*
(Continued)

*Primary Examiner* — Jacob M Amick
*Assistant Examiner* — Michael A Kessler
(74) *Attorney, Agent, or Firm* — Norton Rose Fulbright US LLP

(57) ABSTRACT

An internal combustion engine in which a fuel reforming operation in a fuel reformation cylinder is not executed and a warming operation for raising the temperature of the fuel reformation cylinder is executed, when a gas temperature of a fuel reformation chamber at a time point when a piston in the fuel reformation cylinder reaches a compression top dead point is estimated to fall short of a reforming operation allowable lower limit gas temperature. For example, EGR gas is introduced to the fuel reformation chamber without cooling the EGR gas. Further, during a predetermined period from the expansion stroke to an exhaust stroke of an output cylinder, exhaust gas warming fuel is supplied to a combustion chamber. Further, the fuel is combusted in the fuel reformation chamber.

10 Claims, 6 Drawing Sheets

(51) Int. Cl.

| | |
|---|---|
| *F02D 41/00* | (2006.01) |
| *F02B 51/00* | (2006.01) |
| *F02D 19/06* | (2006.01) |
| *F02D 19/08* | (2006.01) |
| *F02M 26/25* | (2016.01) |
| *F02M 26/05* | (2016.01) |
| *F02M 26/19* | (2016.01) |
| *F01N 3/20* | (2006.01) |
| *F02B 15/00* | (2006.01) |
| *F01N 3/08* | (2006.01) |

(52) U.S. Cl.
CPC ......... *F02D 19/0671* (2013.01); *F02D 19/08* (2013.01); *F02D 41/0025* (2013.01); *F02D 41/0065* (2013.01); *F02M 26/05* (2016.02); *F02M 26/19* (2016.02); *F02M 26/25* (2016.02); *F02M 26/36* (2016.02); *F01N 3/0807* (2013.01)

(58) Field of Classification Search
CPC ............. F02D 41/0065; F02D 41/0067; F02D 41/025; F02D 2041/007; F02D 19/0671; F02D 19/087; F02M 26/36; F02M 27/02
USPC .......................................................... 60/285
See application file for complete search history.

(56) References Cited

U.S. PATENT DOCUMENTS

| | | | |
|---|---|---|---|
| 2008/0314022 A1 | 12/2008 | Reuter et al. | |
| 2010/0212611 A1* | 8/2010 | Yahagi | F02M 25/12 123/3 |
| 2015/0114341 A1* | 4/2015 | Geckler | F02D 41/06 123/295 |
| 2017/0284315 A1* | 10/2017 | Asai | F02M 33/00 |
| 2019/0153965 A1* | 5/2019 | Asai | F02M 21/02 |
| 2019/0226410 A1* | 7/2019 | Asai | F02B 43/04 |
| 2019/0249626 A1* | 8/2019 | Asai | F02B 51/02 |
| 2019/0293012 A1* | 9/2019 | Asai | F02D 41/0027 |
| 2019/0301382 A1* | 10/2019 | Asai | F02B 75/18 |

FOREIGN PATENT DOCUMENTS

| | | | | |
|---|---|---|---|---|
| JP | 2009097425 | A | * | 5/2009 |
| JP | 2010001793 | A | * | 1/2010 |
| JP | 2010-530494 | A | | 9/2010 |
| JP | 2013-007336 | A | | 1/2013 |
| JP | 2013092137 | A | * | 5/2013 |
| JP | 2013-113204 | A | | 6/2013 |
| JP | 2014101772 | A | * | 6/2014 |
| JP | 2014-136978 | A | | 7/2014 |
| JP | 2016-094930 | A | | 5/2016 |
| JP | 2016166611 | A | * | 9/2016 |
| WO | 2006052993 | A2 | | 5/2006 |

OTHER PUBLICATIONS

Machine Translation Provided by Espacenet of JP-2009097425-A (Year: 2020).*
Machine Translation Provided by Espacenet of JP-2010001793-A (Year: 2020).*
English machine translation of description of JP-2013092137-A provided by Espacenet (Year: 2020).*
International Search Report dated Sep. 19, 2017 issued in corresponding PCT Application PCT/JP2017/024045.
European Search Report dated Apr. 8, 2019 issued in corresponding EP Application 17827435.3.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024045, filed on Jun. 29, 2017 which claims priority under 35 U.S.C. § 119 to Japanese Patent Application No. 2016-139571 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method to be applied to an internal combustion engine including a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

In order to cause a fuel reforming reaction in the fuel reformation cylinder, the gas temperature in the fuel reformation cylinder needs to reach a predetermined temperature (a temperature that enables reforming reaction). For example, in cases where the fuel reformation cylinder is a reciprocation type constituted by a piston crank mechanism, the gas temperature in the fuel reformation cylinder needs to reach the predetermined temperature, at the time point where the piston reaches the compression top dead point. In other words, if the gas temperature in the fuel reformation cylinder has not yet reached the predetermined temperature at this time point, the reforming reaction of the fuel in the fuel reformation cylinder is not possible, or the reforming reaction may not be sufficient. Such a circumstance may likely to take place, for example, immediately after cold start of the internal combustion engine, or in an environment with low outside air temperature, high altitude, or the like.

If the reforming reaction is not possible, fuel with a low anti-knock property is supplied to the output cylinder, leading to a situation where occurrence of knocking in the output cylinder is concerned. Further, if a fuel with a high boiling point is used, the fuel may be re-condensed at the outlet of the reforming cylinder, and may be discharged without contribution to combustion.

Such a problem may take place not only in an internal combustion engine which generate reformed fuel by a fuel reformation cylinder, but also in an internal combustion engine which generates reformed fuel with a use of a fuel reforming catalyst. Hereinafter, the fuel reformation cylinder and the fuel reforming catalyst will be collectively referred to as a fuel reformation device.

In view of the above, the inventor of the present invention has conducted study on measures to avoid non-reformed fuel from being supplied from the fuel reformation device to the output cylinder when the gas temperature in the fuel reformation device falls short of a temperature that enables reforming reaction, and to start reforming reaction at an early stage.

The present invention is made in view of the above problems, and it is an object of the present invention to provide a control device and a control method for an internal combustion engine having a fuel reformation device and an output cylinder, the control device and the control method making it possible to avoid a situation where non-reformed fuel is supplied from the fuel reformation device to the output cylinder when the gas temperature in the fuel reformation device falls short of the temperature that enables reforming reaction, and making it possible to start reforming reaction at an early stage.

Solution to Problem

A solution of the present invention to achieve the above-described object premises a control device to be applied to an internal combustion engine including a fuel reformation device capable of generating reformed fuel through a fuel reforming operation and an output cylinder to which the reformed fuel generated in the fuel reformation device is supplied, the output cylinder configured to yield an engine power by combusting the reformed fuel. Such a control device for an internal combustion engine includes a reforming operation control unit configured not to execute the fuel reforming operation in the fuel reformation device, and configured to raise the temperature of the fuel reformation device, when a gas temperature in the fuel reformation device is estimated as to fall short of a reforming operation allowable lower limit gas temperature set based on a lower limit value of a reforming reaction enabling temperature.

As specified above, the reforming operation control unit does not execute the fuel reforming operation in the fuel reformation device, when a gas temperature in the fuel reformation device, at a time when the gas temperature in the fuel reformation device reaches its highest temperature, is estimated to be less than the reforming operation allowable lower limit gas temperature. This way, supply of non-reformed fuel from the fuel reformation device to the output cylinder due to a low gas temperature can be avoided. Further, the reforming operation control unit executes a warming operation (preheating operation of the fuel reforming apparatus) which raises the temperature of the fuel reformation device. This way, the temperature of the fuel reformation device can be raised at an early stage, and the fuel reforming operation can be started at an early stage. In other words, an operation of the internal combustion engine, which uses reformed fuel to reduce a NOx emission amount and a soot discharge amount, can be started at an early stage.

Further, the fuel reformation device is preferably structured by a reciprocation type fuel reformation cylinder in which a piston reciprocates in the cylinder, and the reforming operation control unit is configured not to execute the fuel reforming operation in the fuel reformation cylinder, when the gas temperature in the fuel reformation cylinder at a time point when the piston in the fuel reformation cylinder reaches a compression top dead point is estimated to fall short of the reforming operation allowable lower limit gas temperature, It is preferable that the warming operation of the fuel reformation cylinder is executed to raise the gas temperature in the fuel reformation cylinder.

In general, the gas in the fuel reformation cylinder is in the most compressed state when the piston reaches the compression top dead point, and the gas temperature at this point is the highest temperature in a single cycle. Therefore, by determining whether or not the gas temperature in the fuel reformation cylinder when the piston reaches the compression top dead point reaches the reforming operation allowable lower limit gas temperature, whether or not the reforming reaction of the fuel is possible in the cycle can be determined. As a result, whether to execute the warming operation for the fuel reformation cylinder can be accurately determined.

Further, the control device preferably includes an output cylinder bypass passage which communicates an outlet passage of the fuel reformation device with an exhaust passage of the output cylinder, the output cylinder bypass passage being provided with a bypass amount adjusting valve, wherein the bypass amount adjusting valve is opened in the warming operation, and when the warming operation is terminated and a fuel reforming operation in the fuel reformation device is started, the bypass amount adjusting valve is closed.

By opening the bypass amount adjusting valve during the warming operation, the gas from the fuel reformation device is exhausted to the exhaust passage of the output cylinder. The gas is not supplied to the output cylinder or little gas from the fuel reformation device is supplied to the output cylinder. This suppresses or reduces the exhaust gas of the fuel reformation device from being supplied to the output cylinder during the first warming operation, deteriorating combustion in the output cylinder. Further, when reforming reaction in the fuel reformation device becomes possible due to the gas temperature in the fuel reformation device reaching the reforming operation allowable lower limit gas temperature and the like, the warming operation is terminated and the fuel reforming operation is started in the fuel reformation device. With this, the bypass amount adjusting valve is closed. This way, the reformed fuel from the fuel reformation device is supplied to the output cylinder, and combustion in the output cylinder involving the reformed fuel is started.

Further, the control device preferably includes an EGR passage communicating an inlet passage of the fuel reformation device and an exhaust passage of the output cylinder, the EGR passage having a cooler for cooling EGR gas and connected to a cooler bypass passage for bypassing the cooler, wherein, in the warming operation, exhaust gas flowing through the exhaust passage of the output cylinder is partially introduced to the inlet passage of the fuel reformation device through the cooler bypass passage.

With this, in the warming operation, exhaust gas flowing through the exhaust passage of the output cylinder partially flows in the cooler bypass passage, and is introduced to the inlet passage of the fuel reformation device without being cooled by the cooler. In other words, the fuel reformation device is warmed by the high-temperature exhaust gas. Therefore, the fuel reforming operation in the fuel reformation device can be started at an early stage.

Further, the output cylinder is preferably structured as a reciprocation type in which a piston reciprocates in the cylinder, and in the warming operation, an exhaust gas warming fuel is preferably supplied to the output cylinder for a predetermined period from an expansion stroke to an exhaust stroke of the output cylinder.

With this, the temperature of the exhaust gas is raised by combustion of the exhaust gas warming fuel in the exhaust passage of the output cylinder and the like. As a result, the temperature of the gas introduced to the inlet passage of the fuel reformation device through the cooler bypass passage can be raised the fuel reformation device can be more effectively warmed. Therefore, the fuel reforming operation in the fuel reformation device can be started at an early stage. Further, since the exhaust gas warming fuel is supplied in a predetermine period from the expansion stroke to the exhaust stroke of the output cylinder, the output from the output cylinder is not largely fluctuated.

Further, in the warming operation, an amount of fuel within a range that allows fuel combustion in the fuel reformation device and that makes the equivalence ratio in the fuel reformation device less than 1 is preferably supplied to the fuel reformation device.

In this case, the warming-up of the fuel reformation device is promoted by the combustion of the fuel in the fuel reformation device, and the gas temperature in the fuel reformation device reaches the reforming operation allowable lower limit gas temperature in a relatively short period of time. Therefore, the fuel reforming operation can be started at an early stage.

Further, the reforming operation control unit is preferably configured to terminate the warming operation and execute the fuel reforming operation in the fuel reformation device, when the gas temperature in the fuel reformation device reaches the reforming operation allowable lower limit gas temperature during the warming operation, or when the quantity of heat supplied to the fuel reformation device reaches a predetermined quantity during the warming operation.

When the gas temperature in the fuel reformation device reaches the reforming operation allowable lower limit gas temperature during the warming operation, or when the quantity of heat supplied to the fuel reformation device reaches a predetermined quantity during the warming operation (when a condition for terminating the warming operation is established), the fuel reformation device is in a state that enables reforming reaction of fuel therein. For this reason, when the condition is established, the warming operation is terminated and the fuel reforming operation in the fuel reformation device is executed. This way, the fuel reforming operation can be started at appropriate timing.

Further, the scope of the technical thought of the present invention encompasses a control method for the internal combustion engine implemented by the control device for the internal combustion engine according to each of the above described solutions. Namely, it is premised that a control method is applied to an internal combustion engine including a fuel reformation device capable of generating reformed fuel through a fuel reforming operation and an output cylinder to which the reformed fuel generated in the fuel reformation device is supplied, the output cylinder configured to yield an engine power by combusting the reformed fuel. In such a control method of the internal combustion engine, the fuel reforming operation in the fuel reformation device is not executed, and a warming operation is executed for raising the temperature of the fuel reformation device, when a gas temperature in the fuel reformation device is estimated as to fall short of a reforming operation allowable lower limit gas temperature set based on a lower limit value of a reforming reaction enabling temperature.

With this control method too, supply of non-reformed fuel from the fuel reformation device to the output cylinder due to a low gas temperature can be avoided, as is hereinabove described. Further, the temperature of the fuel reformation device can be raised at an early stage, and the fuel reforming operation can be started at an early stage.

Advantageous Effects of Invention

In the present invention, the fuel reforming operation in the fuel reformation device is not executed, and a warming operation is executed for raising the temperature of the fuel reformation device, when a gas temperature in the fuel reformation device is estimated as to fall short of a reforming operation allowable lower limit gas temperature. This way, supply of non-reformed fuel from the fuel reformation device to the output cylinder due to a low gas temperature can be avoided. Further, the temperature of the fuel reformation device can be raised at an early stage, and the fuel reforming operation can be started at an early stage.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
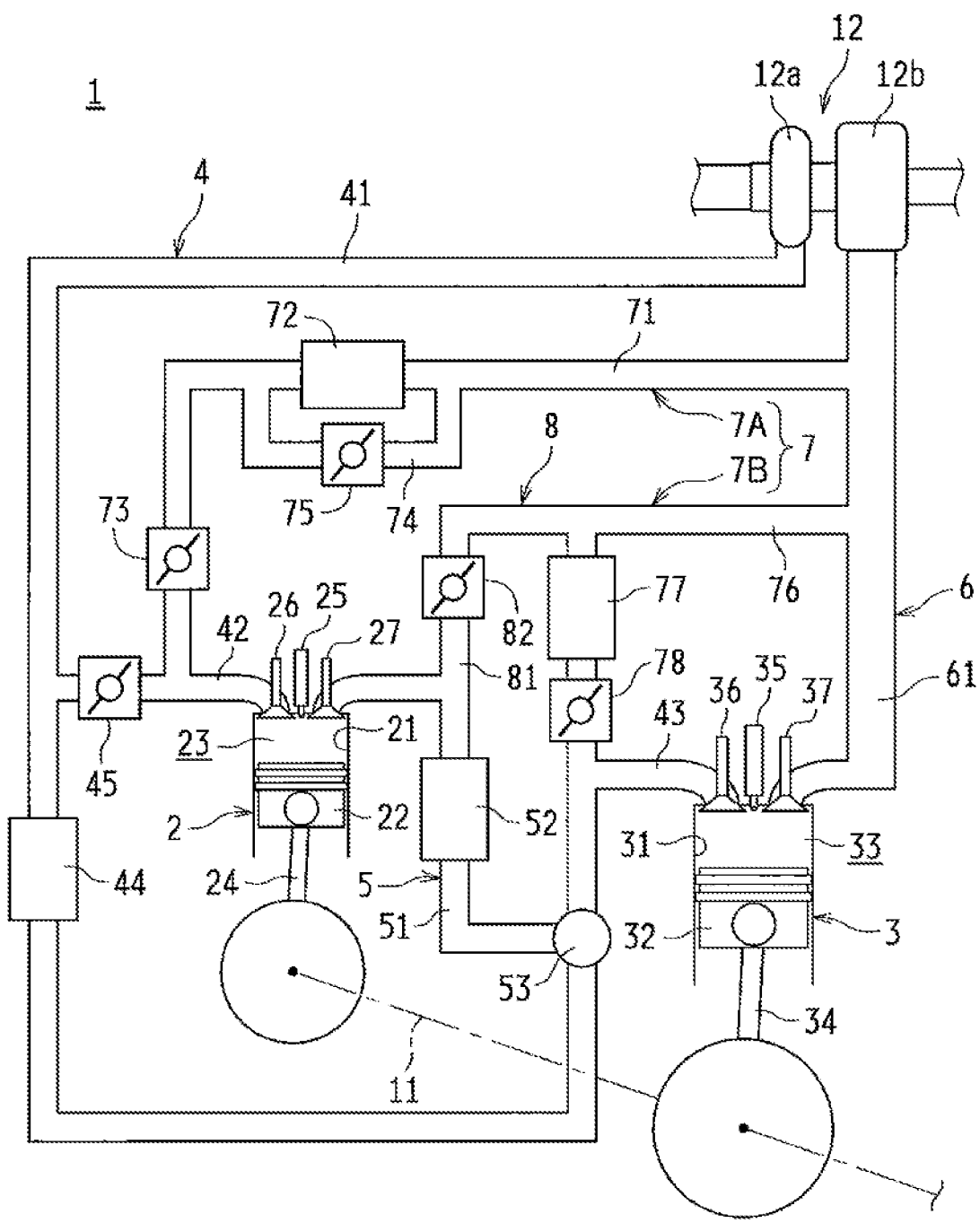
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 serving as a fuel reformation device of the present invention and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main inlet passage 41. This main air-intake passage 41 is branched into two systems: i.e., a fuel reformation cylinder air-intake passage (an inlet passage of the fuel reformation device of the present invention) 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage (outlet passage of the fuel reformation device of the present invention) 51. The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage (exhaust passage of the output cylinder of the present invention) 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage (EGR passage of the present invention) 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage (cooler bypass passage of the present invention) 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
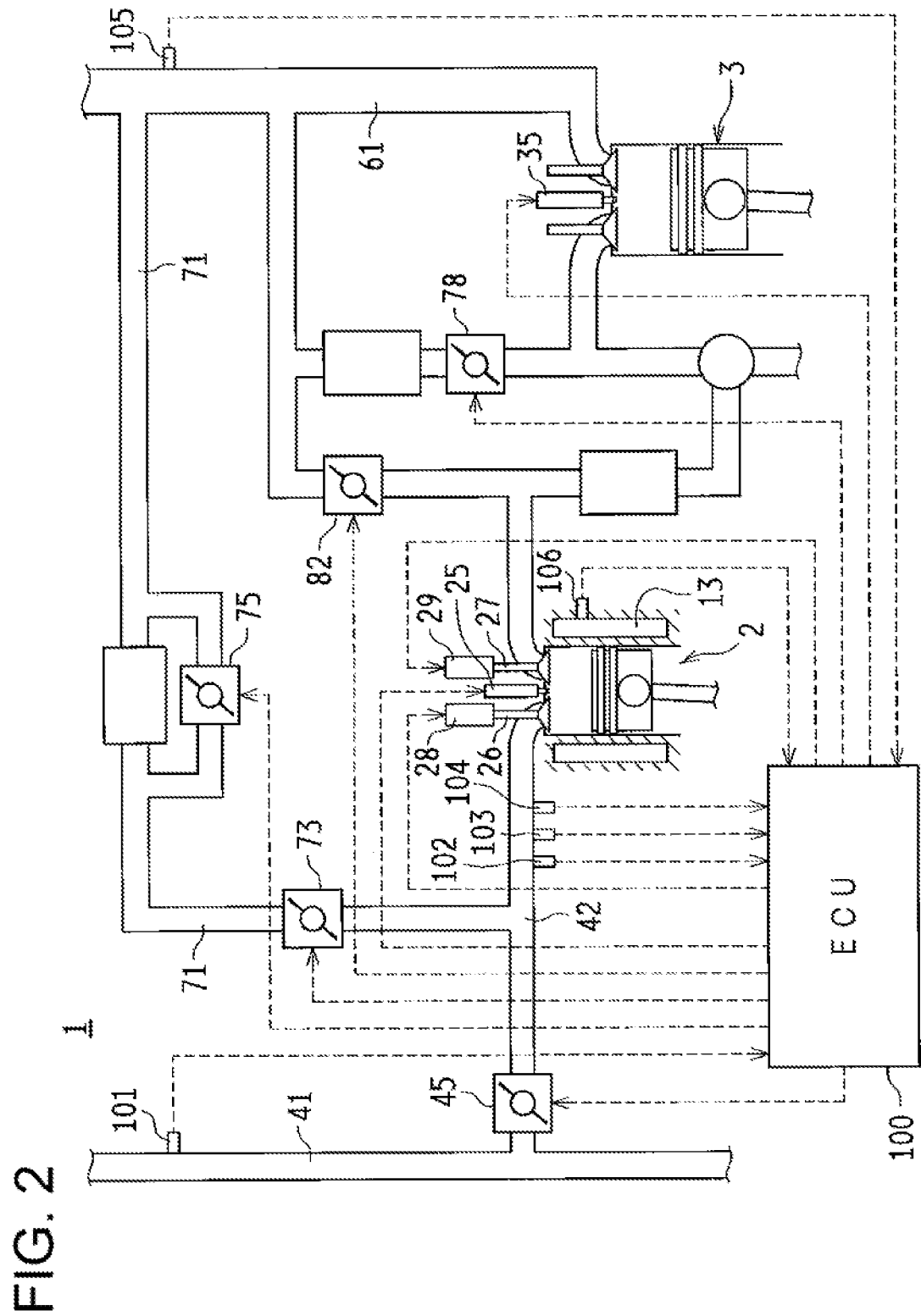
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in gas 02 sensor 104, an exhaust pressure sensor 105, a water temperature sensor 106, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The taken-in gas 02 sensor 104 transmits, to the ECU 100, an output signal corresponding to the concentration of oxygen in the taken-in gas flowing in the fuel reformation cylinder air-intake passage 42. Specifically, an output signal corresponding to the oxygen concentration in the taken-in gas in the fuel reformation cylinder air-intake passage 42, on the downstream side of a portion communicating with the fuel reformation cylinder EGR passage 71 is transmitted to the ECU 100.

The exhaust pressure sensor 105 transmits, to the ECU 100, an output signal corresponding to the pressure of the exhaust gas flowing in the exhaust passage 61. Specifically, an output signal corresponding to the exhaust pressure of the exhaust passage 61 on the upstream side of the portion communicating with the fuel reformation cylinder EGR passage 71 is transmitted to the ECU 100.

The water temperature sensor 106 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 106 and the like, the ECU 100 performs: fuel injection control (opening and closing control of the injectors 25, 35) of the injectors 25, 35; opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lower limit value of a reforming reaction enabling temperature as will be described later, according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
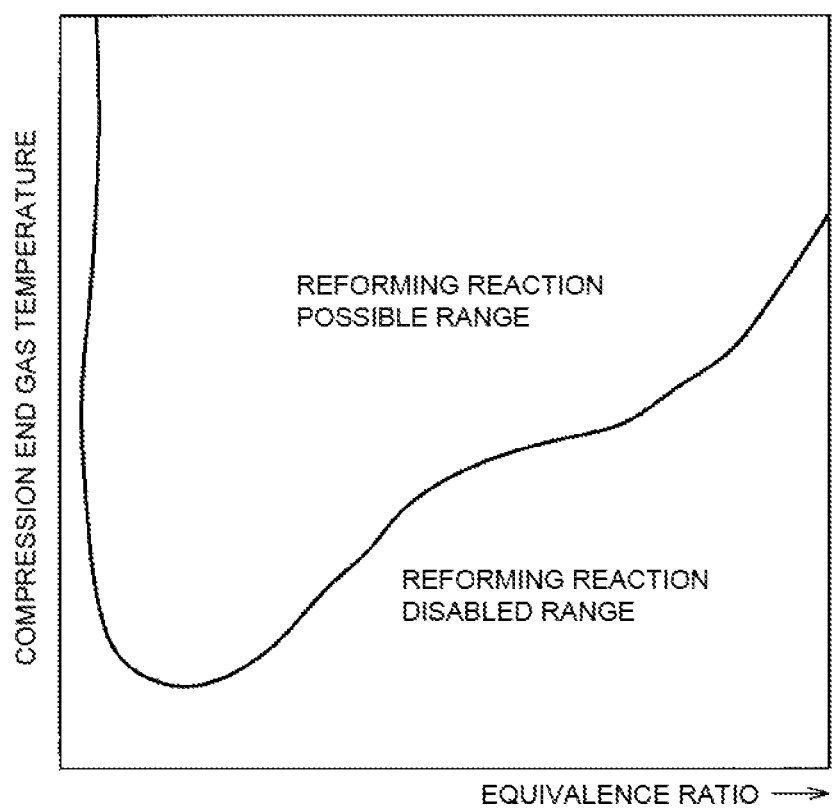
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming 30 reaction in the fuel reformation chamber 23, an equivalence ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Control of Fuel Reforming Operation—

Next, the following describes control of the fuel reforming operation, which is a characteristic of the present embodiment. As described above, to enable reforming reaction in the fuel reformation chamber 23, the compression end gas temperature needs to be higher with an increase in the equivalence ratio of the air-fuel mixture in the fuel reformation chamber 23. That is, there is a lower limit value in the compression end gas temperature (the temperature may be hereinafter referred to as reforming reaction enabling temperature) for enabling the reforming reaction, based on the equivalence ratio of the air-fuel mixture. Therefore, if the compression end gas temperature is lower than the lower limit value of the reforming reaction enabling temperature based on the equivalence ratio of the air-fuel mixture, the reforming reaction of the fuel in the fuel reformation chamber 23 may not be possible or may not be sufficient, even when the fuel is supplied from the injector 25 to the fuel reformation chamber 23. Such a circumstance may likely to take place, for example, immediately after cold start of the internal combustion engine 1, or in an environment with low outside air temperature, high altitude, or the like.

If the reforming reaction is not possible, fuel with a low anti-knock property (light oil and the like) is supplied to the output cylinder 3, leading to a situation where occurrence of knocking in the output cylinder 3 is concerned.

In view of this problem, in the present embodiment, the reforming operation allowable lower limit gas temperature is set based on the lower limit value of the reforming reaction enabling temperature, according to the equivalence ratio of the air-fuel mixture. When the gas temperature (compression end gas temperature) of the fuel reformation chamber 23 at the time point when the piston 22 in the fuel reformation cylinder 2 reaches the compression top dead point does not reach the reforming operation allowable lower limit gas temperature, the fuel reforming operation in the fuel reformation cylinder 2 is not executed. Further, at this time, a warming operation (preheating operation of the fuel reformation cylinder 2) which raises the temperature of the fuel reformation chamber 23 (e.g., bore wall surface temperature of the fuel reformation chamber 23) is executed. This is specifically described hereinbelow.

In the control of the fuel reforming operation in the present embodiment, the estimated actual compression end gas temperature is compared with the reforming operation allowable lower limit gas temperature.

When the actual compression end gas temperature is estimated to be equal to or higher than the reforming operation allowable lower limit gas temperature, the fuel reforming operation of the fuel reformation cylinder 2 is enabled (executed) in that cycle. In other words, fuel is supplied from the injector 25 to the fuel reformation chamber 23 (fuel is supplied to set a high equivalence ratio in the fuel reformation chamber 23 for enabling the reforming reaction).

To the contrary, when the actual compression end gas temperature is estimated to be lower than the reforming operation allowable lower limit gas temperature, the fuel reforming operation of the fuel reformation cylinder 2 is prohibited (not executed) in that cycle. When the fuel reforming operation in the fuel reformation cylinder 2 is prohibited as described above, the warming operation for raising the temperature of the fuel reformation cylinder 2 is executed. This warming operation will be described later.

In the following, an operation of calculating an actual compression end gas temperature (estimating operation), an operation of setting the reforming operation allowable lower limit gas temperature (reforming operation allowable lower limit gas temperature set based on the lower limit value of the reforming reaction enabling temperature), and control of the fuel reforming operation using the actual compression end gas temperature and the reforming operation allowable lower limit gas temperature are described in this order.

(Operation of Calculating Compression End Gas Temperature)

First, the operation of calculating the actual compression end gas temperature (estimating operation) will be described.

The actual compression end gas temperature in the fuel reformation chamber 23 can be calculated (estimated) by the following formula (1).

[Formula 1]

$$T_{TDC} = T_{ini} \cdot \varepsilon^{\kappa-1} \quad (1)$$

In the formula (1), $T_{TDC}$ is the compression end gas temperature, $T_{ini}$ is the gas temperature before the compression; i.e., the taken-in gas temperature, $\varepsilon$ is the effective compression ratio of the fuel reformation cylinder 2, and K is the polytropic number of the taken-in gas in the fuel reformation chamber 23.

The following describes, calculation of each parameter in the formula (1).

(Intake-Gas Temperature $T_{ini}$)

The taken-in gas temperature $T_{ini}$ is calculated based on the output signal from the taken-in gas temperature sensor 103. The taken-in gas temperature $T_{ini}$ calculated here is the temperature of the taken-in gas on the downstream side of a portion of the fuel reformation cylinder EGR passage 71 communicating with the fuel reformation cylinder air-intake passage 42.

Alternatively, the temperature of the taken-in gas flowing through the air-intake port of the fuel reformation cylinder 2 may be adopted as the taken-in gas temperature $T_{ini}$, instead of the temperature of the taken-in gas flowing through the fuel reformation cylinder air-intake passage 42. Alternatively, the gas temperature of the fuel reformation chamber 23 at the time when the piston 22 reaches the intake bottom dead point or the gas temperature of the fuel reformation chamber 23 at the time when the air-intake valve 26 is closed may be detected or estimated, and used as the taken-in gas temperature $T_{ini}$.

(Effective Compression Ratio $\varepsilon$ of Fuel Reformation Cylinder)

An effective compression ratio $\varepsilon$ of the fuel reformation cylinder 2 is calculated as a ratio of a volume of the fuel reformation chamber 23 at a time point when the air-intake valve 26 in the fuel reformation cylinder 2 is closed and a volume of the fuel reformation cylinder 23 at a time point when the piston 22 reaches the compression top dead point. The effective compression ratio $\varepsilon$ of the fuel reformation cylinder 2 may be obtained simply on a basis of the ratio of the volume of the fuel reformation chamber 23 when the piston 22 is at the bottom dead point and the volume of the fuel reformation chamber 23 when the piston 22 is at the top dead point (apparent compression ratio).

(Polytropic Number κ)

The polytropic number κ is defined as a ratio of a specific heat at constant pressure and a specific heat at constant volume in the gas compression stroke in the fuel reformation chamber 23. When the total amount of taken-in gas is air and there is no heat outflow to the cylinder wall surface, κ=about 1.4. However, since the actual polytropic number of the taken-in gas in the fuel reformation chamber 23 differs from that in cases where the total amount is air or where there is no heat outflow. Therefore, the polytropic number is modified as described below.

To the polytropic number κ in the formula (1), a polytropic number obtained through any one of: modification based on the cooling water temperature, modification based on the gas composition, and modification of the equivalence ratio. Alternatively, a polytropic number obtained through a combination of two or more of these modifications may be applied to the polytropic number κ in the formula (1).

Modification of Polytropic Number Based on Cooling Water Temperature

The polytropic number κ varies according to the amount of heat loss. As described above, the cooling water passage 13 is formed in the cylinder block, and there is a heat outflow toward the cooling water flowing through the cooling water passage 13. Therefore, the amount of heat loss can be predicted by calculating the temperature of the cooling water based on the output from the water temperature sensor 106. Alternatively, by grasping the relationship between the cooling water temperature and the amount of heat loss in advance, the amount of heat loss can be estimated from the cooling water temperature.

Figure 4:
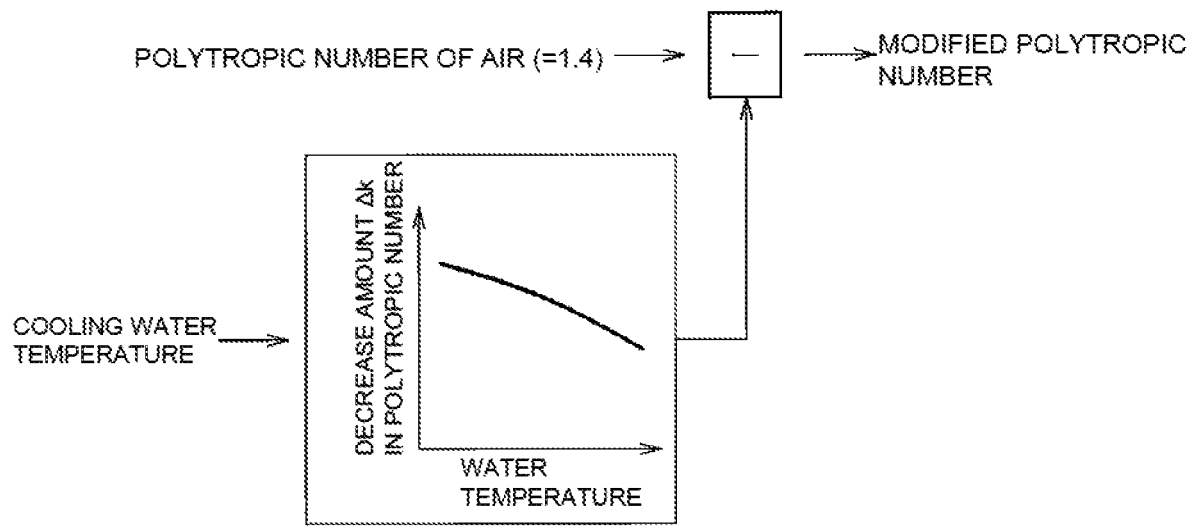
FIG. 4 A block diagram showing arithmetic logic of a modified polytropic number based on the cooling water temperature.

FIG. 4 is a block diagram showing arithmetic logic of a modified polytropic number based on the cooling water temperature. As shown in FIG. 4, a decrease amount Δκ in the polytropic number is evaluated from the cooling water temperature calculated based on the output from the water temperature sensor 106. By subtracting this decrease amount from the polytropic number of the air, the modified polytropic number corresponding to the cooling water temperature (corresponding to the heat loss amount) can be obtained. The relationship between the cooling water temperature and the decrease amount Δκ of the polytropic number is obtained in advance by an experiment or a simulation.

Modification of Polytropic Number Based on Gas Composition

The polytropic number κ also varies according to the gas composition in the fuel reformation chamber 23. That is, when the taken-in gas is entirely the air, most of the taken-in gas is 2 atomic molecules, and the polytropic number κ is about "1.4". On the other hand, if the intake-gas contains burned gas ($CO_2$ or $H_2O$) or a fuel, the ratio of the 2 atomic molecules decreases, and so does the polytropic number κ.

Therefore, based on an output signal from the taken-in gas $O_2$ sensor 104, a mole fraction of carbon dioxide in the taken-in gas is calculated based on the mole fraction of oxygen in the intake-gas. Then, the polytropic number is estimated based on the mole fraction of each gas component.

For example, a molar specific heat at constant pressure of the taken-in gas is first determined according to the following formula (2).

[Formula 2]

$$C_{p\_intake} = \sum_i \psi_i \cdot C_{p\_i} \quad (2)$$

In the formula (2), $C_{p\#intake}$ is the molar specific heat at constant pressure of the taken-in gas, $\psi_I$ is the mole fraction of each gas component, and $C_{p\#I}$ is the molar specific heat at constant pressure of each gas component.

Thus, the polytropic number κ of the taken-in gas can be calculated with the following formula (3).

[Formula 3]

$$\kappa = \frac{C_{p\_intake}}{C_{p\_intake} - 8.314} \quad (3)$$

This way, the modified polytropic number corresponding to the gas composition can be obtained.

Modification of Polytropic Number Based on Equivalence Ratio

By estimating the equivalence ratio in the fuel reformation chamber 23, the polytropic number κ can be also obtained through correcting calculation from that equivalence ratio.

Figure 5:
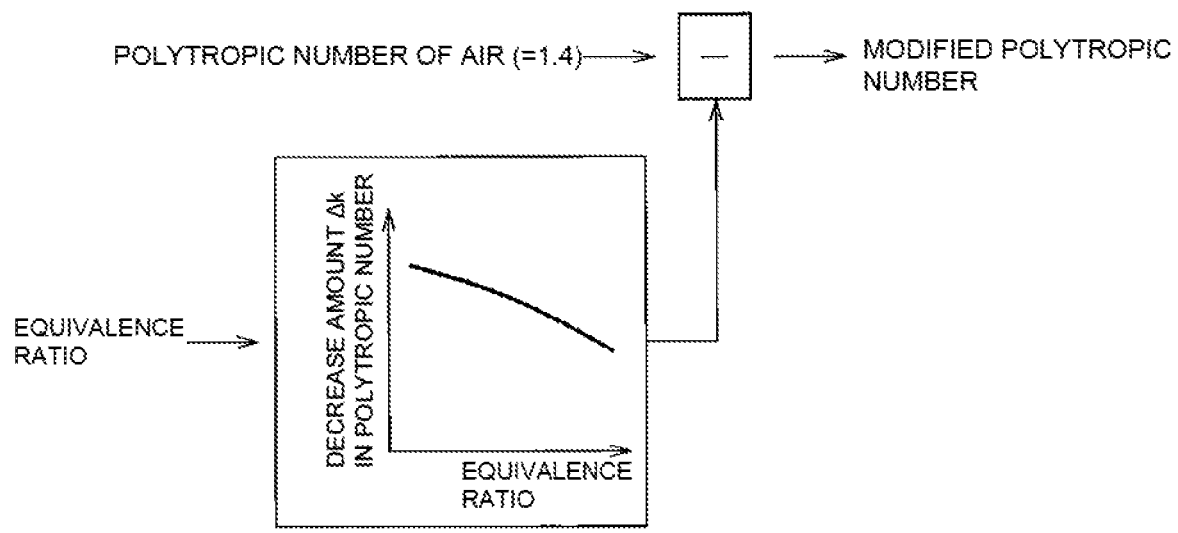
FIG. 5 A block diagram showing arithmetic logic of a modified polytropic number based on the equivalence ratio.

FIG. 5 is a block diagram showing arithmetic logic of a modified polytropic number based on the equivalence ratio. As shown in FIG. 5, a decrease amount Δκ in the polytropic number is evaluated from the equivalence ratio. By subtracting this decrease amount from the polytropic number of the air, the modified polytropic number corresponding to the equivalence ratio can be obtained. The relationship between the equivalence ratio and the decrease amount Δκ of the polytropic number is obtained in advance by an experiment or a simulation.

A method of calculating the equivalence ratio in this case is as follows. Namely, the flow rate of the taken-in air is calculated based on the output signal from the intake-air flow sensor 101. Further, an EGR gas amount (an amount of EGR gas introduced into the fuel reformation cylinder 2) is calculated from a difference between the pressure of the taken-in gas calculated based on the output signal from the taken-in gas pressure sensor 102 and the pressure of the exhaust gas calculated based on the output signal from the exhaust pressure sensor 105. The equivalence ratio is calculated from the flow rate of the taken-in air, the EGR gas amount, and the fuel supply amount to the fuel reformation chamber 23 (i.e., the fuel supply amount evaluated from an injection command value to the injector 25). In cases of not considering the EGR gas amount, the equivalence ratio may be calculated from a ratio of the flow rate of the taken-in air calculated based on the output signal from the intake-air flow sensor 101 and the fuel supply amount to the fuel reformation chamber 23.

(Setting Operation of Reforming Operation Allowable Lower Limit Gas Temperature)

Next, the following describes an operation of setting the reforming operation allowable lower limit gas temperature (which substantially matches with the lower limit value of the reforming reaction enabling temperature of the present embodiment). As described above, the reforming operation allowable lower limit gas temperature is set based on the equivalence ratio of the air-fuel mixture. That is, as is obvious from FIG. 3, the lower limit value of the reforming reaction enabling temperature becomes higher with an increase in the equivalence ratio of the air-fuel mixture, and therefore the reforming operation allowable lower limit gas temperature is set to a higher value, with an increase in the equivalence ratio of the air-fuel mixture in the fuel reformation chamber 23. Further, the lower limit value of the reforming reaction enabling temperature varies depending on not only the equivalence ratio of the air-fuel mixture, but also on the type of the fuel. For example, if the ratio of carbon and hydrogen in the fuel is different, the reactivity of the fuel is largely varied. In cases of an oxygen-containing fuel containing oxygen atoms in a fuel molecules, the reactivity of the fuel largely varies depending on the amount of oxygen. Thus, the type of fuel considered for setting the reforming operation allowable lower limit gas temperature.

Figure 6:
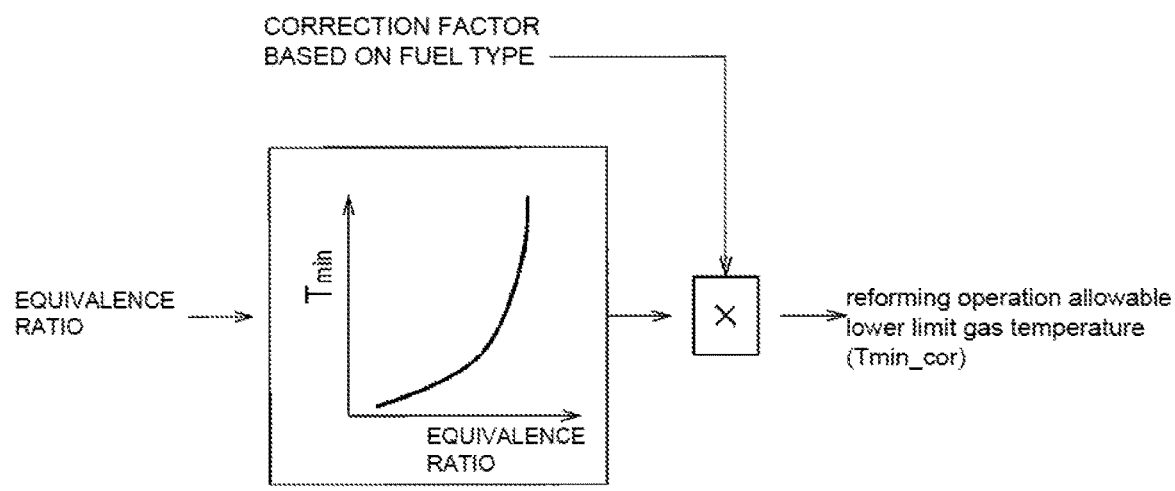
FIG. 6 A block diagram showing arithmetic logic of a reforming operation allowable lower limit gas temperature.

FIG. 6 is a block diagram showing arithmetic logic of a reforming operation allowable lower limit gas temperature. As shown in FIG. 6, a base value $T_{min}$ of the reforming operation allowable lower limit gas temperature is obtained based on the equivalence ratio of the air-fuel mixture. This base value is multiplied by a correction factor which is based on the type of the fuel to correct the base value $T_{min}$ of the reforming operation allowable lower limit gas temperature, thereby obtaining the reforming operation allowable lower limit gas temperature $T_{min\#cor}$ corresponding to the equivalence ratio of the air-fuel mixture and the type of the fuel.

The relationship between the equivalence ratio of the air-fuel mixture and the base value $T_{min}$ of the reforming operation allowable lower limit gas temperature is obtained in advance by an experiment or a simulation. Specifically, as should be understood from FIG. 3, the relationship between the equivalence ratio of the air-fuel mixture and the base value $T_{min}$ of the reforming operation allowable lower limit gas temperature is such that the higher the equivalence ratio of the air-fuel mixture, the higher the base value $T_{min}$. Therefore, the reforming operation allowable lower limit gas temperature $T_{min\#cor}$ is higher with a higher equivalence ratio of the fuel reformation chamber 23.

Further, as described above, the lower limit value of the reforming reaction enabling temperature varies also depending on the type of the fuel. To correct the base value $T_{min}$ of the reforming operation allowable lower limit gas temperature according to the type of the fuel, the base value $T_{min}$ of the reforming operation allowable lower limit gas temperature is multiplied by a correction factor based on the type of the fuel, thereby obtaining the reforming operation allowable lower limit gas temperature $T_{min\#cor}$ corresponding to the type of the fuel to be used. As a value of the correction factor which is based on the type of the fuel, the relationship between the type of the fuel and the value of the correction factor is grasped in advance by an experiment or a simulation. Then, the value of the correction factor corresponding to the type of the fuel to be used is applied to the arithmetic logic shown in FIG. 6. The value of the correction factor which is based on the type of the fuel is input to the ECU 100 in advance, according to the type of the fuel to be supplied to the not-shown fuel tank.

(Warming Operation)

As the warming operation for raising the temperature of the fuel reformation cylinder 2 described above, there are the following four types of warming operations as examples. Any one of these warming operations will be executed, when the compression end gas temperature $T_{TDC}$ is estimated as to fall short of the reforming operation allowable lower limit gas temperature $T_{min\#cor}$. The following describes each of the warming operations.

First Warming Operation

The following describes a first warming operation. In the first warming operation, the temperature of the fuel reformation cylinder 2 is raised by using high-temperature exhaust gas from the output cylinder 3.

In this first warming operation, the bypass amount adjusting valve 82, the EGR gas amount adjusting valve 73, and the bypass amount adjusting valve 75 are all opened. For example, all the adjustment valves 82, 73, 75 are fully opened.

This way, the exhaust gas from the fuel reformation chamber 23 is introduced to the exhaust passage 61 via the output cylinder bypass passage 81. The exhaust gas from the fuel reformation chamber 23 is not introduced to the combustion chamber 33, or little exhaust gas from the fuel reformation chamber 23 is introduced to the combustion chamber 33.

As described hereinabove, the fuel reforming operation in the fuel reformation cylinder 2 is not executed during the warming operation. For example, fuel supply from an injector 25 to the fuel reformation chamber 23 is stopped. In the output cylinder 3, on the other hand, fuel is supplied from the injector 35 to the combustion chamber 33 to obtain a required engine power. The fuel supply amount to the combustion chamber 33 in this case is set so that the equivalence ratio in the combustion chamber 33 is less than 1. This way, combustion corresponding to an ordinary diesel combustion takes place in the combustion chamber 33, thus yielding an engine power of the internal combustion engine 1. Exhaust gas generated in the combustion chamber 33 is then discharged to the exhaust passage 61.

The exhaust gas flowing through the exhaust passage 61 partially flows from the exhaust passage 61 into the fuel reformation cylinder EGR passage 71. Most of this exhaust gas is bypassed the EGR gas cooler 72 (flows through the cooler bypass passage 74) and introduced to the fuel reformation chamber 23 of the fuel reformation cylinder 2 through the fuel reformation cylinder air-intake passage 42, i.e., introduced without being cooled by the EGR gas cooler 72. With introduction of the relatively high-temperature EGR gas to the fuel reformation chamber 23, the bore wall surface of the fuel reformation chamber 23 is warmed.

In this first warming operation, the gas exhausted from the fuel reformation chamber 23 (the gas containing the exhaust gas (EGR gas) exhausted from the output cylinder 3 through the fuel reformation cylinder EGR system 7A) is not introduced to the combustion chamber 33, or little amount of the gas discharged from the fuel reformation chamber 23 is introduced to the combustion chamber 33. This suppresses or reduces the exhaust gas of the fuel reformation cylinder 2 from being supplied from the fuel reformation chamber 23 to the combustion chamber 33 during the first warming operation, deteriorating combustion in the output cylinder 3.

The bypass amount adjusting valve 82 is closed when the first warming operation ends (e.g., when the compression end gas temperature $T_{TDC}$ reaches the reforming operation allowable lower limit gas temperature $T_{min\#cor}$ and the like, and the first warming operation ends). This is for supplying the reformed fuel to the combustion chamber 33, because generation of reformed fuel in the fuel reformation chamber 23 starts with the ending of the first warming operation.

Second Warming Operation

The following describes a second warming operation. In addition to the operation of the first warming operation, the second warming operation raises the temperature of the exhaust gas discharged from the output cylinder 3.

In the second warming operation, an exhaust gas warming fuel is supplied to the combustion chamber 33 of the output cylinder 3 for a predetermined period from the expansion stroke to the exhaust stroke of the output cylinder 3 (e.g., a period from 150° to 200° after the compression top dead point (ATDC)). As a result, the temperature of the exhaust gas flowing through the exhaust passage 61 rises due to, for example, combustion of the exhaust gas warming fuel in the exhaust passage 61. In this case, an injection amount of the exhaust gas warming fuel (an injection amount determined by an injection period) is set through an experiment or a simulation, according to a required amount of warming in the temperature of the exhaust gas, which is experimentally evaluated.

As a result, the temperature of the EGR gas introduced to the fuel reformation chamber 23 of the fuel reformation cylinder 2 via the fuel reformation cylinder EGR passage 71, the cooler bypass passage 74, and the fuel reformation cylinder air-intake passage 42 can be raised, and the bore wall surface of the fuel reformation chamber 23 can be effectively warmed.

Further, since the exhaust gas warming fuel is supplied for the predetermined period from the expansion stroke to the exhaust stroke of the output cylinder 3 in the second warming operation, the output of the output cylinder 3 is not significantly fluctuated.

In the second warming operation, the exhaust passage 61 may be provided with a not-shown injector, and the fuel supplied from the injector may be combusted in the exhaust passage 61 so as to increase the temperature of the exhaust gas.

Third Warming Operation

The following describes a third warming operation. In addition to the operation in the second warming operation, the third warming operation warms up the fuel reformation chamber 23 by combustion of air-fuel mixture in the fuel reformation chamber 23.

In the third warming operation, fuel is supplied from an injector 25 to the fuel reformation chamber 23. The fuel is supplied so that the equivalence ratio in the fuel reformation chamber 23 is less than 1. This way, lean mixture is combusted in the fuel reformation chamber 23. Exhaust gas generated in the fuel reformation chamber 23 is then discharged to the exhaust passage 61 through the output cylinder bypass passage 81. With the above described combustion of the air-fuel mixture in the fuel reformation chamber 23, the bore wall surface of the fuel reformation chamber 23 is effectively warmed.

In the third warming operation, the engine power is generated due to combustion of the air-fuel mixture in the fuel reformation chamber 23. Therefore, the amount of fuel supplied from the injector 35 to the combustion chamber 33 and the fuel supply timing in the output cylinder 3 needs to be adjusted so that the total engine output which is the sum of the engine power from the output cylinder 3 and the engine power from the fuel reformation cylinder 2 matches with the required engine power.

The output cylinder 3 is for obtaining the engine power, and the fuel reformation cylinder 2 is mainly for generating reformed fuel. Therefore, their structures are different from each other. Generally, the combustion performance of the fuel reformation cylinder 2 is lower than the combustion performance of the output cylinder 3. For example, when fuel supply amount to the fuel reformation cylinder 2 is equal to the fuel supply amount to the output cylinder 3, the fuel consumption rate may deteriorate, and the amount of NOx and the amount of smoke in the exhaust gas from the fuel reformation cylinder 2 may increase. Therefore, the fuel injection amount of each of the cylinders 2, 3 is determined so that the performance of the entire internal combustion engine 1 is not significantly impaired while warming the fuel reformation cylinder 2. For example, the fuel supply amount to the fuel reformation cylinder 2 is set to be smaller than the fuel supply amount to the output cylinder 3.

Fourth Warming Operation

Next, the following describes a fourth warming operation. In the fourth warming operation, the bypass amount adjusting valve 82 is opened. Meanwhile, the EGR gas amount adjusting valve 73 and the bypass amount adjusting valve 75 are both closed. Further, fuel is supplied from the injector 25 to the fuel reformation chamber 23, as in the case of the third warming operation. The fuel is supplied so that the equivalence ratio in the fuel reformation chamber 23 is less than 1, as in the case of the third warming operation. This way, lean mixture is combusted in the fuel reformation chamber 23. Exhaust gas generated in the fuel reformation chamber 23 is then discharged to the exhaust passage 61 through the output cylinder bypass passage 81. With the fourth warming operation, combustion of the air-fuel mixture in the fuel reformation chamber 23 is performed, so that the bore wall surface of the fuel reformation chamber 23 is effectively warmed.

(Control of Fuel Reforming Operation)

Next, the following describes control of the fuel reforming operation using the compression end gas temperature $T_{TDC}$ and the reforming operation allowable lower limit gas temperature $T_{min\#cor}$.

Figure 7:
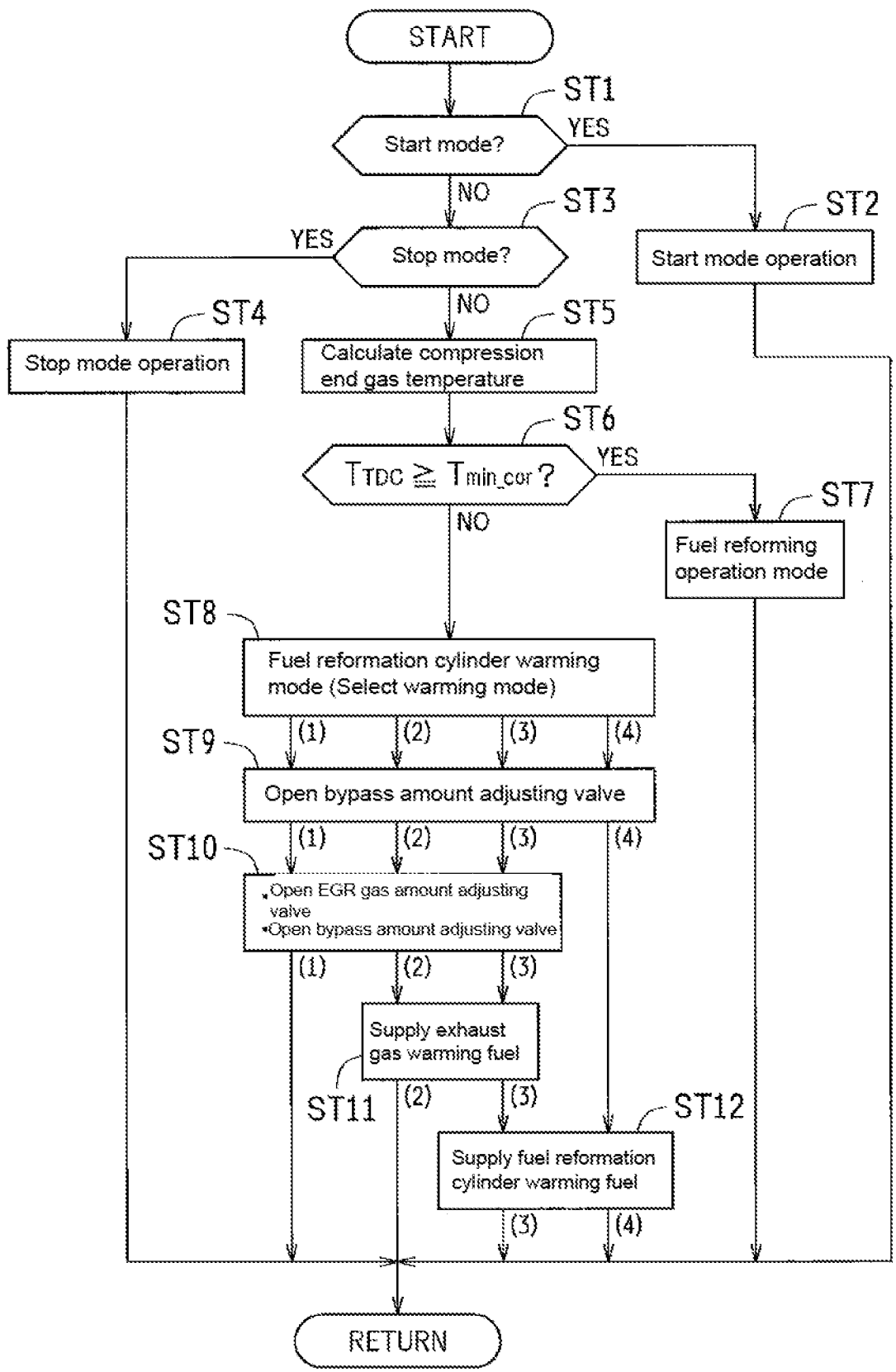
FIG. 7 A flowchart showing a control procedure for switching the operation mode of the internal combustion engine.

FIG. 7 is a flowchart showing a control procedure for switching the operation mode of the internal combustion engine 1.

First, in step ST1, whether or not the operation mode of the internal combustion engine 1 is in the start mode is determined. This start mode is a mode to be entered immediately after starting of the internal combustion engine 1. That is the operation mode enters the start mode when the internal combustion engine 1 is started by, for example, an ON-operation of the start switch. The start mode is continued for a predetermined period.

The step ST1 results in YES if the operation mode of the internal combustion engine 1 is the start mode, and the process proceeds to the step ST2 and continued in the start mode.

Specifically, in the start mode, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Thus, combustion takes place in each of the fuel reformation chamber 23 and the combustion chamber 33. Cranking by the starter is continued until each of the cylinders 2, 3 are independently operable. The start mode ends when the cylinders 2, 3 are each in the independently operable state.

The start mode may be such that fuel is injected to the combustion chamber 33 only from the injector 35 of the output cylinder 3, and the fuel is not injected from the injector 25 of the fuel reformation cylinder 2. In this case, the start mode ends when the output cylinder 3 is in the independently operable state.

When the operation mode of the internal combustion engine 1 is not in the start mode and the step ST1 results in NO, the process proceeds to the step ST3 to determine whether or not the operation mode of the internal combustion engine 1 is in the stop mode. This stop mode is a mode to be entered at the time of stopping the internal combustion engine 1. That is, when a stop instruction is given to the internal combustion engine 1 by, for example, ON-operation of the stop switch, the step ST3 results in YES and the process proceeds to the step ST4 and an operation of the stop mode is executed.

Specifically, in the stop mode, the fuel injection from the injector 25 of the fuel reformation cylinder 2 is stopped. This stops the reforming reaction of the fuel in the fuel reformation chamber 23, and supply of the reformed fuel to the combustion chamber 33 is therefore stopped. Hence, the internal combustion engine 1 is stopped.

As described hereinabove, the fuel reforming operation in the fuel reformation cylinder 2 is not executed regardless of the compression end gas temperature $T_{TDC}$, when the operation mode is the start mode or the stop mode.

When the internal combustion engine 1 is not in the stop mode and the step ST3 results in NO, the process proceeds to the step ST5 to calculate (estimate) the compression end gas temperature $T_{TDC}$ with the above mentioned formula (1). In other words, the taken-in gas temperature $T_{ini}$, the effective compression ratio c of the fuel reformation cylinder 2, and the polytropic number κ are calculated as hereinabove described, and are applied to the above formula (1) to calculate the compression end gas temperature $T_{TDC}$. It should be noted that, in cases where the closing timing of the air-intake valve 26 is fixed, the effective compression ratio c does not have to be calculated, and the effective compression ratio ε is a fixed value.

After calculation of the compression end gas temperature $T_{TDC}$ as described above, the process proceeds to the step ST6 and by comparing the compression end gas temperature $T_{TDC}$ with the reforming operation allowable lower limit gas temperature $T_{min\#cor}$ whether or not the reforming reaction is possible is determined. Specifically, whether or not the compression end gas temperature $T_{TDC}$ is equal to or higher than the reforming operation allowable lower limit gas temperature $T_{min\#cor}$ is determined.

If the compression end gas temperature $T_{TDC}$ is equal to or higher than the reforming operation allowable lower limit gas temperature $T_{min\#cor}$, the step ST6 results in YES, determining that the reforming reaction is possible. On the other hand, if the compression end gas temperature $T_{TDC}$ is less than the reforming operation allowable lower limit gas temperature $T_{min\#cor}$, the step ST6 results in NO, determining that the reforming reaction is not possible.

When a reforming reaction is possible and the step ST6 results in YES, the fuel reforming operation is executed in the step ST7. That is, the operation mode of the internal combustion engine 1 turns into a fuel reforming operation mode. As described in the basic operation of the internal combustion engine 1, in the fuel reforming operation mode, the fuel is supplied from the injector 25 to the fuel reformation chamber 23 (fuel is supplied to set a high equivalence ratio in the fuel reformation chamber 23 for enabling the reforming reaction).

On the other hand, when the reforming reaction is not possible and the step ST6 results in NO, an operation of a fuel reformation cylinder warming mode is executed in the step ST8. In step ST8, one of the aforementioned first to fourth warming operations is selected. The warming operation selected is determined in advance by an experiment or a simulation using the operational state, various temperatures, and the like of the internal combustion engine 1, as parameters.

When the first warming operation is selected, the step of opening the bypass amount adjusting valve 82 (step ST9), and the step of opening the EGR gas amount adjusting valve 73 and the bypass amount adjusting valve 75 (step ST10) are carried out, as is indicated by (1) in the figure. This way, as is described hereinabove, the exhaust gas from the fuel reformation chamber 23 (gas containing the exhaust gas (EGR gas) exhausted from the output cylinder 3 through the fuel reformation cylinder EGR system 7A) is introduced to the exhaust passage 61 via the output cylinder bypass passage 81. The exhaust gas from the fuel reformation chamber 23 is not introduced to the combustion chamber 33, or little exhaust gas from the fuel reformation chamber 23 is introduced to the combustion chamber 33. Further, as is described hereinabove, the exhaust gas flowing through the exhaust passage 61 partially flows from the exhaust passage 61 into the fuel reformation cylinder EGR passage 71 and introduced to the fuel reformation chamber 23 of the fuel reformation cylinder 2 through the fuel reformation cylinder air-intake passage 42, i.e., introduced without being cooled by the EGR gas cooler 72. With introduction of the relatively high-temperature EGR gas to the fuel reformation chamber 23, the bore wall surface of the fuel reformation chamber 23 is warmed.

When the second warming operation is selected, the step of opening the bypass amount adjusting valve 82 (step ST9), the step of opening the EGR gas amount adjusting valve 73 and the bypass amount adjusting valve 75 (step ST10), and as an operation of supplying the exhaust gas warming fuel, the step of supplying the exhaust gas warming fuel to the combustion chamber 33 of the output cylinder 3 for the predetermined period from the expansion stroke to the exhaust stroke of the cylinder 3 (step ST11) are carried out, as is indicated by (2) in the figure. As a result, the temperature of the exhaust gas flowing through the exhaust passage 61 rises due to, for example, combustion of the exhaust gas warming fuel in the exhaust passage 61, as hereinabove described. As a result, the temperature of the EGR gas introduced to the fuel reformation chamber 23 of the fuel reformation cylinder 2 via the fuel reformation cylinder EGR passage 71, the cooler bypass passage 74, and the fuel reformation cylinder air-intake passage 42 can be raised, and the bore wall surface of the fuel reformation chamber 23 can be effectively warmed.

When the third warming operation is selected, the step of opening the bypass amount adjusting valve 82 (step ST9), the step of opening the EGR gas amount adjusting valve 73 and the bypass amount adjusting valve 75 (step ST10), the step of supplying the exhaust gas warming fuel (step ST11), and as an operation for supplying fuel reformation cylinder warming fuel, the step of supplying a fuel to the fuel reformation chamber 23 of the injector 25 (step ST12) are performed, as is indicated by (3) in the figure. This way, lean mixture is combusted in the fuel reformation chamber 23, as is described hereinabove. With the above described combustion of the air-fuel mixture in the fuel reformation chamber 23, the bore wall surface of the fuel reformation chamber 23 is effectively warmed.

When the fourth warming operation is selected, the step of opening the bypass amount adjusting valve 82 (step ST9), and as the operation for supplying fuel reformation cylinder warming fuel, the step of supplying a fuel to the fuel reformation chamber 23 of the injector 25 (step ST12) are performed, as is indicated by (4) in the figure. This way, lean mixture is combusted in the fuel reformation chamber 23, as is described hereinabove. With the above described combustion of the air-fuel mixture in the fuel reformation chamber 23, the bore wall surface of the fuel reformation chamber 23 is effectively warmed.

By repeating the above operation, for example, the operation mode enters the fuel reformation cylinder warming mode, if the compression end gas temperature $T_{TDC}$ has not yet reached the reforming operation allowable lower limit gas temperature $T_{min\#cor}$, after the start mode is cancelled. In this mode, the fuel reforming operation is not executed and any of the warming operations is executed. Further, even when the compression end gas temperature $T_{TDC}$ reaches the reforming operation allowable lower limit gas temperature $T_{min\#cor}$ and the fuel reforming operation is executed (the operation mode enters the fuel reforming operation mode), the operation mode is set to the fuel reformation cylinder warming mode if compression end gas temperature $T_{TDC}$ drops below the reforming operation allowable lower limit gas temperature $T_{min\#cor}$.

The operation of the step ST6 to ST12 corresponds to an operation by a reforming operation control unit of the present invention "configured not to execute the fuel reforming operation in the fuel reformation device, and configured to execute a warming operation for raising the temperature of the fuel reformation device, when a gas temperature in the fuel reformation device is estimated as to fall short of a reforming operation allowable lower limit gas temperature set based on a lower limit value of a reforming reaction enabling temperature".

The control of the fuel reforming operation is executed by the ECU 100. Therefore, the functional part of the ECU 100 that executes this control corresponds to the control device described in the present invention. Further, a method of control executed by the ECU 100 corresponds to a control method referred to in the present invention.

As hereinabove described, in the present embodiment, a fuel reforming operation in a fuel reformation cylinder 2 is not executed and a warming operation for raising the temperature of the fuel reformation cylinder 2 is executed, when a gas temperature of the fuel reformation chamber 23 at a time point when a piston 22 in the fuel reformation cylinder 2 reaches a compression top dead point (compression end gas temperature) is estimated to fall short of a reforming operation allowable lower limit gas temperature set based on the equivalence ratio of the air-fuel mixture and the like. This way, supply of non-reformed fuel from the fuel reformation cylinder 2 to the output cylinder 3 due to a low gas temperature (low compression end gas temperature) can be avoided. Therefore, a fuel with a low anti-knock property is not supplied to the output cylinder, and knocking in the output cylinder 3 can be avoided. Further, the temperature of the fuel reformation cylinder 2 can be raised at an early stage, and the fuel reforming operation can be started at an early stage. In other words, an operation of the internal combustion engine 1, which uses reformed fuel to reduce a NOx emission amount and a soot discharge amount, can be started at an early stage.

Further, in the present embodiment, the fuel reforming operation in the fuel reformation cylinder 2 is not executed and a warming operation for raising the temperature of the fuel reformation chamber 23 is executed, when the compression end gas temperature $T_{TDC}$ is estimated as to fall short of the reforming operation allowable lower limit gas temperature $T_{min\#cor}$. Therefore, whether or not the reforming reaction of the fuel is possible in the cycle can be determined. As a result, whether to execute the warming operation for the fuel reformation cylinder 2 can be accurately determined.

Modification

The following describes a modification. The above embodiment deals with a case where the warming operation is terminated when the compression end gas temperature $T_{TDC}$ reaches the reforming operation allowable lower limit gas temperature $T_{min\#cor}$. total heat quantity In this modification, the warming operation is terminated when the total quantity of heat supplied to the fuel reformation chamber 23 reaches a predetermined value during the warming operation. This is specifically described hereinbelow.

The total heat quantity supplied to the fuel reformation chamber 23 can be calculated (estimated) according to the following formula (4).

[Formula 4]

$$Q_{tot} = G_{gas\_in} \cdot C_v \cdot (T_{in} - T_{amb}) + LHV \cdot G_{fuel} + C_{cor} \quad (4)$$

In the formula (4), $Q_{tot}$ is the total heat quantity supplied to the fuel reformation chamber 23; $G_{gas\#in}$ is an integrated value of the flow rate of the gas introduced to the fuel reformation chamber 23; Cv is a specific heat at constant volume of the reaction gas in the fuel reformation chamber 23; $T_{in}$ is the inlet temperature of the fuel reformation chamber 23; $T_{amb}$ is an ambient air temperature or a taken-in air temperature at the time of starting up; LHV is a lower heating value of the fuel; $G_{fuel}$ is an integrated fuel supply amount to the fuel reformation chamber 23; and $C_{or}$ is a correction value of the total quantity of heat.

The integrated value $G_{gas\#in}$ of the flow rate of the gas can be calculated based on the output signal from the intake-air flow sensor 101, the opening degree of the air-intake amount adjust valve 45, and the like. The specific heat at constant volume Cv of the reaction gas can be calculated based on the composition of the fuel supplied from the injector 25 (the type of fuel), the equivalence ratio of the fuel reformation chamber 23, and the like. The inlet temperature $T_{in}$ of the fuel reformation chamber 23 can be calculated based on the output signal from the taken-in gas temperature sensor 103. The ambient air temperature or a taken-in air temperature $T_{amb}$ can be calculated based on the output signal from a not-shown external air temperature sensor. The lower heating value LHV can be calculated based on the composition of the fuel (the type of fuel). The integrated fuel supply amount $G_{fuel}$ to the fuel reformation chamber 23 can be calculated by integrating the fuel supply amount obtained from the injection command value for the injector 25. The correction value $C_{cor}$ of the total heat quantity is an amount of correction corresponding to the heat outflow or the like to the cylinder wall surface of the fuel reformation chamber 23, and is given based on the temperature of the cooling water calculated based on the output from the water temperature sensor 106, and the like.

The first member on the right side of the formula (4) is the quantity of heat energy stemming from introduction of the EGR gas to the fuel reformation chamber 23. The second member is the quantity of heat energy stemming from combustion of fuel supplied from the injector 25 to the fuel reformation chamber 23. The third member is an amount of correction according to the heat outflow and the like to the cylinder wall surface of the fuel reformation chamber 23.

When the total heat quantity calculated as described above reaches the predetermined amount (when transition occurs from the fuel reformation cylinder warming mode to the fuel reforming operation mode), the warming operation is terminated. The predetermined value (the threshold value of the total heat quantity) is set in advance through an experiment or a simulation and stored in the ROM as the total quantity of heat for the compression end gas temperature $T_{TDC}$ of the fuel reformation cylinder 2 to reach the reforming operation allowable lower limit gas temperature $T_{min\#cor}$.

With the present modification, the fuel reforming operation can be started at an early stage, and an operation of the internal combustion engine 1, which uses reformed fuel to reduce a NOx emission amount and a soot discharge amount, can be started at an early stage, as in the case of the embodiment.

Other Embodiments

Note that the above embodiment is illustrative in all respects, and is not intended to be a basis for limiting interpretation. Accordingly, the scope of the present invention is not to be interpreted solely by the foregoing embodiments, but is defined based on the description of the appended claims. Further, the technical scope of the present invention includes all changes within the meaning and scope of the appended claims.

For example, the above embodiment deals with a case where the present invention is applied to an internal combustion engine 1 for a ship, but the present invention is also applicable to an internal combustion engine in other applications (e.g., an electric power generator, a vehicle, and the like).

Further, the above embodiment deals with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

In addition, the above embodiment deals with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, the above embodiment deals with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

Further, the above embodiment deals with a case where the compression end gas temperature $T_{TDC}$ and the reforming operation allowable lower limit gas temperature $T_{min\#cor}$ are compared to determine whether or not reforming reaction is possible. The present invention is not limited to this. For example, if it is possible to determine whether or not the reforming reaction is possible simply based on the taken-in gas temperature $T_{ini}$ calculated based on the output signal from the taken-in gas temperature sensor 103, the operation mode may be set so that the fuel reforming operation in the fuel reformation cylinder 2 is not executed, based on only the taken-in gas temperature $T_{ini}$ (the fuel reforming operation is not executed when the taken-in gas temperature $T_{ini}$ is less than a predetermined value).

In addition, in the above embodiment, the reforming operation allowable lower limit gas temperature $T_{min\#cor}$ is made substantially equal to the lower limit value of the reforming reaction enabling temperature. The present invention is not limited to this, and the reforming operation allowable lower limit gas temperature $T_{min\#cor}$ may be set at a temperature a predetermined value higher than the lower limit value of the reforming reaction enabling temperature. With this, the operation mode can be changed from the fuel reforming operation non-execution mode to the fuel reforming operation mode, when the compression end gas temperature $T_{TDC}$ is sufficiently high. Therefore, reliability of the reforming reaction of the fuel in the fuel reformation cylinder 2 can be further improved.

The present embodiment deals with a case where the present invention is applied to an internal combustion engine 1 configured to generate reformed fuel in its fuel reformation cylinder 2. However, application of the present invention is not limited to this, and the present invention may be applied to an internal combustion engine configured to generate reformed fuel by using a fuel reforming catalyst. In such a case, a temperature sensor for the fuel reforming catalyst is provided to determine whether the internal temperature of the fuel reforming catalyst has reached the reforming operation allowable lower limit gas temperature (the lower limit value of the reforming reaction enabling temperature). When the temperature of the fuel reforming catalyst has not reached the reforming operation allowable lower limit gas temperature, the warming operation is executed. Examples of the warming operation in such a case includes warming up of the fuel reforming catalyst by using high-temperature exhaust gas from the output cylinder 3, as is the case of the above-described first warming operation, or raising the temperature of the exhaust gas from the output cylinder 3, as is the case of the above-described second warming operation.

This application claims priority from Japanese Patent Application No. 2016-139571, filed in Japan on Jul. 14, 2016. The entire content of the application is hereby incorporated in the present application by reference.

INDUSTRIAL APPLICABILITY

The present invention is applicable to control of an internal combustion engine including a fuel reformation cylinder and an output cylinder.

REFERENCE SIGNS LIST 1 internal combustion engine
2 fuel reformation cylinder (fuel reformation device)
21, 31 cylinder bore
22, 32 piston
3 output cylinder
42 fuel reformation cylinder air-intake passage (inlet passage of fuel reformation device)
51 reformed fuel supply passage (outlet passage of fuel reformation device)
61 exhaust passage (exhaust passage of output cylinder)
71 fuel reformation cylinder EGR passage (EGR passage)
72 EGR gas cooler (cooler)
74 cooler bypass passage
81 output cylinder bypass passage
82 bypass amount adjusting valve
100 ECU

The invention claimed is:

1. A control device for an internal combustion engine including a fuel reformation device capable of generating reformed fuel through a fuel reforming operation and an output cylinder to which the reformed fuel generated in the fuel reformation device is supplied, the output cylinder being configured to yield an engine power by combusting the reformed fuel, the control device comprising:
a reforming operation control unit configured not to execute the fuel reforming operation in the fuel reformation device, and configured to execute a warming operation for raising a temperature of the fuel reformation device, when a gas temperature in the fuel reformation device is estimated to fall short of a reforming operation allowable lower limit gas temperature set based on a lower limit value of a reforming reaction enabling temperature; and
an output cylinder bypass passage which communicates an outlet passage of the fuel reformation device with an exhaust passage of the output cylinder, the output cylinder bypass passage including a bypass amount adjusting valve;
wherein the bypass amount adjusting valve is opened in the warming operation, and when the warming operation is terminated and a fuel reforming operation in the fuel reformation device is started, the bypass amount adjusting valve is closed.

2. The control device according to claim 1, wherein:
the fuel reformation device comprises a reciprocation type fuel reformation cylinder in which a piston reciprocates in the cylinder, and
the reforming operation control unit is configured not to execute the fuel reforming operation in the fuel reformation cylinder, when the gas temperature in the fuel reformation cylinder at a time point when the piston in the fuel reformation cylinder reaches a compression top dead point is estimated to fall short of the reforming operation allowable lower limit gas temperature, and the warming operation of the fuel reformation cylinder is executed to raise the gas temperature in the fuel reformation cylinder.

3. The control device according to claim 1, further comprising
an EGR passage communicating an inlet passage of the fuel reformation device and an exhaust passage of the output cylinder, the EGR passage having a cooler for cooling EGR gas and being connected to a cooler bypass passage bypassing the cooler, wherein
in the warming operation, exhaust gas flowing through the exhaust passage of the output cylinder is partially introduced to the inlet passage of the fuel reformation device through the cooler bypass passage.

4. The control device according to claim 3, wherein:
the output cylinder comprises a reciprocation type cylinder in which a piston reciprocates in the cylinder, and
in the warming operation, an exhaust gas warming fuel is supplied to the output cylinder for a predetermined period from an expansion stroke to an exhaust stroke of the output cylinder.

5. The control device according to claim 1, wherein:
in the warming operation, an amount of fuel is supplied to the fuel reformation device within a range that allows fuel combustion in the fuel reformation device and that makes an equivalence ratio in the fuel reformation device less than 1.

6. The control device according to claim 1, wherein the reforming operation control unit is configured to terminate the warming operation and execute the fuel reforming operation in the fuel reformation device, when the gas temperature in the fuel reformation device reaches the reforming operation allowable lower limit gas temperature during the warming operation, or when a quantity of heat supplied to the fuel reformation device reaches a predetermined quantity during the warming operation.

7. A control method for an internal combustion engine including a fuel reformation device capable of generating reformed fuel through a fuel reforming operation and an output cylinder to which the reformed fuel generated in the fuel reformation device is supplied, the output cylinder being configured to yield an engine power by combusting the reformed fuel, the control method comprising:
prohibiting a fuel reforming operation in the fuel reformation device, and executing a warming operation for raising a temperature of the fuel reformation device, when a gas temperature in the fuel reformation device is estimated to fall short of a reforming operation allowable lower limit gas temperature set based on a lower limit value of a reforming reaction enabling temperature;
during the warming operation, opening a first bypass amount adjusting valve disposed on an output cylinder bypass passage which communicates an outlet passage of the fuel reformation device with an exhaust passage of the output cylinder; and
when the warming operation is terminated and a fuel reforming operation in the fuel reformation device is started, closing the first bypass amount adjusting valve.

8. The control method of claim 7, wherein:
the fuel reformation device includes an engine having a plurality of cylinders each configured to house a respective reciprocation type piston, the plurality of cylinders comprising a fuel reformation cylinder and one or more output cylinders,
the estimated gas temperature in the fuel reformation cylinder is estimated at a time point when the piston in the fuel reformation cylinder reaches a compression top dead point; and
the warming operation includes raising the gas temperature in the fuel reformation cylinder.

9. The control method of claim 7, further comprising:
during the warming operation, opening a second bypass amount adjusting valve disposed in a cooler bypass passage to bypass a cooler of an EGR passage that connects an inlet passage of the fuel reformation device to an exhaust passage of the output cylinder.

10. The control method of claim 7, wherein, during the warming operation injecting fuel within a fuel reformation cylinder such that an equivalence ratio of the gas within the fuel reformation cylinder is less than one.

* * * * *